No. 833,303.  
PATENTED OCT. 16, 1906.  
T. CLARK.  
WATER GATE.  
APPLICATION FILED MAY 14, 1906.
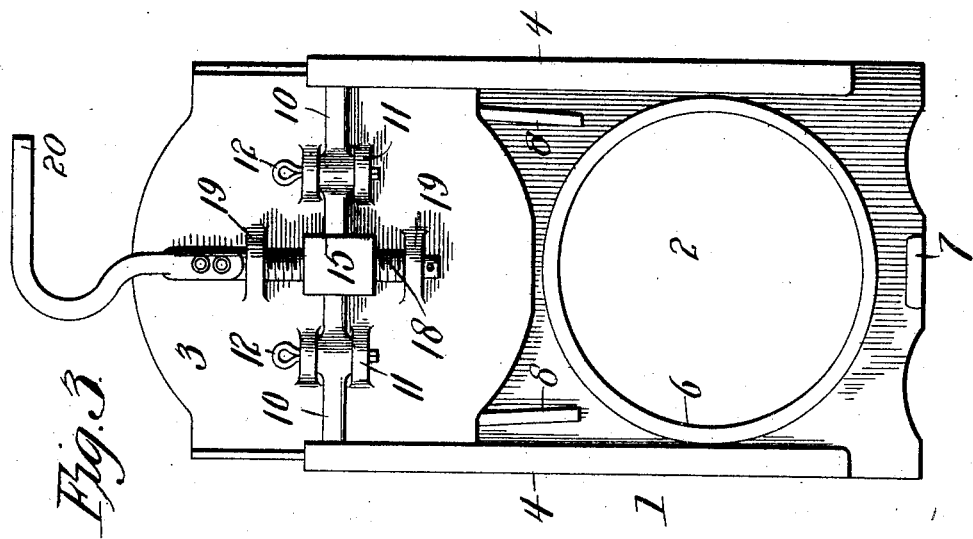
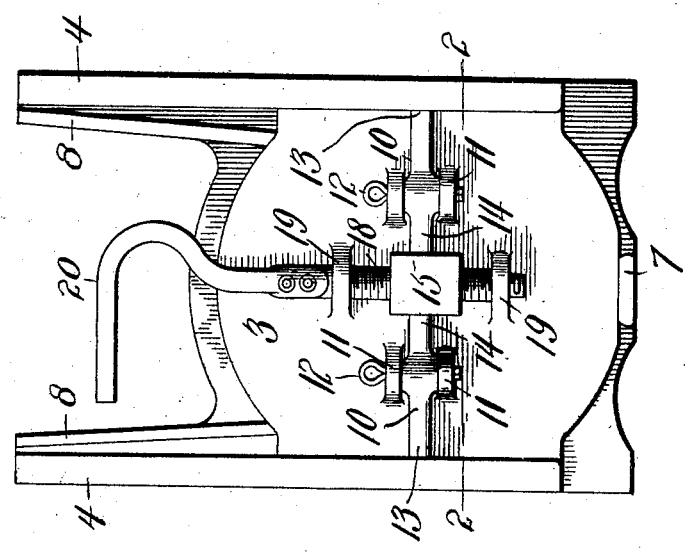
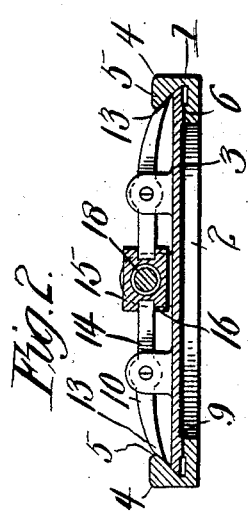
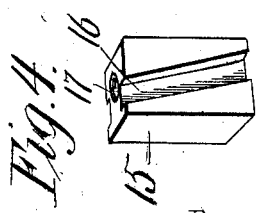
WITNESSES  
INVENTOR  
Truston Clark,  
BY  
Attorney

UNITED STATES PATENT OFFICE.

TRUSTON CLARK, OF POMONA, CALIFORNIA.

WATER-GATE.

No. 833,303.        Specification of Letters Patent.        Patented Oct. 16, 1906.

Application filed May 14, 1906. Serial No. 316,834.

*To all whom it may concern:*

Be it known that I, TRUSTON CLARK, a citizen of the United States, residing at Pomona, in the county of Los Angeles, State of California, have invented certain new and useful Improvements in Water-Gates, of which the following is a specification, reference being had therein to the accompanying drawings.

This invention relates to a water-gate, and particularly to means for securing the gate in either its open or closed position.

The invention has for an object to provide locking-levers mounted upon the gate adapted to engage the undercut ribs of the casting in which the gate slides, together with means for actuating said levers so as to force the gate against its seat when closed or to maintain it in an open or raised position.

A further object of the invention is to provide an improved construction of actuating-nut mounted upon a screw carried upon the gate and having engaging faces to contact with the locking-levers for the gate.

Other and further objects and advantages of the invention will be hereinafter set forth and the novel features thereof defined by the appended claims.

In the drawings, Figure 1 is an elevation of the gate in closed position. Fig. 2 is a cross-section on line 2 2, Fig. 1. Fig. 3 is an elevation of the gate open, and Fig. 4 is a detail perspective of the actuating-nut.

Like numerals of reference indicate like parts through the several views of the drawings.

The numeral 1 designates the main frame or casting, which is provided with an aperture 2, adapted to be closed by the gate 3, which is mounted in any suitable manner to control the water-supply. This frame is provided at its opposite sides with ribs or ways 4, preferably having inclined undercut faces, as shown at 5 in Fig. 2. Surrounding the opening 2 is a ground valve-seat 6 and beneath said opening the stop-lug 7. The ribs 4 form guide-flanges and extend upward above the opening 2, so as to retain the gate in position when raised, as shown in Fig. 3, and adjacent to the upper end of these flanges are raised ground ribs 8, against which the gate 3 may be clamped to retain it in its elevated position.

The gate 3 is provided with an annular ground rib 9 upon its face next the frame, adapted to seat upon the ground faces of the frame provided for that purpose. In order to clamp the gate firmly upon these faces, the pivotally-mounted locking-levers 10 are provided. These levers are mounted in lugs 11, provided upon the face of the gate, by means of a bolt or pin 12, extending through the lugs and levers. The outer ends 13 of the levers are preferably inclined, as shown in Fig. 2, and extend beneath the undercut ribs or guide-flanges 4 at each side of the frame. These levers may be actuated in any desired manner. For instance, the inner ends 14 thereof may be extended into contact with the actuating-nut 15, which is provided with engaging grooves 16, disposed diagonally to the longitudinal axis thereof. This nut is also provided with a threaded aperture 17, through which the screw 18 passes in order to produce a travel of the nut, this screw being rotatably mounted in lugs 19, provided upon the face of the gate and adapted to be rotated by means of any suitable handle, as indicated at 20, attached to the upper end of the screw.

The gate is shown in Fig. 1 in its closed or locked position, and it may be unlocked for raising the same into the position shown in Fig. 3 by the rotation of the handle upon the screw, so as to draw the actuating-nut upward and raise the inner ends of the locking-levers 2 to relieve the pressure thereof against the guide-flanges. The gate is then free to be lifted to any desired extent and there be secured either in its completely-raised or partially-raised position by again rotating the handle, so as to place the pressure upon the locking-levers and force the seat of the gate into contact with the ground ribs provided at the upper portion of the frame for that purpose. This operation of the locking-levers is very simply and efficiently effected by means of the actuating-nut having the engaging faces at opposite sides for these levers, and it will be seen that when the gate is in closed position the ground face thereon may be brought into firm contact with the coöperating face upon the frame, so as to secure an absolutely water-tight joint which locks the gate against any accidental raising thereof. The invention therefore provides a very simple, efficient, and economical construction of water gate, which can be produced in any desired size or configuration of parts suitable for the use or application intended.

Having now described my invention and set forth its merits, what I claim, and desire to secure by Letters Patent, is—

1. A water-gate comprising a frame provided with guide-flanges at opposite sides, a gate mounted to slide beneath said flanges, locking-levers pivotally mounted upon said gate to engage the flanges of the frame, and means carried by the gate for actuating said levers.

2. A water-gate comprising a frame provided with guide-flanges at opposite sides, a gate mounted to slide beneath said flanges, locking-levers pivotally mounted upon said gate to engage the flanges of the frame, an actuating device provided with engaging means at its opposite sides to receive the inner ends of said levers, and means for moving said device.

3. A water-gate comprising a frame provided with guide-flanges at opposite sides, a gate mounted to slide beneath said flanges, locking-levers pivotally mounted upon said gate to engage the flanges of the frame, an actuating device provided with engaging means at its opposite sides to receive the inner ends of said levers, and a screw rotatably mounted upon the gate and threaded through said device.

4. A water-gate comprising a frame provided at opposite sides with undercut guide-flanges, an annular ground seat at the lower portion of said frame, opposite ground ribs extended upward from said seat adjacent to said flanges, and a sliding gate mounted to travel in said flanges.

5. A water-gate comprising a frame provided at opposite sides with undercut guide-flanges, an annular ground seat at the lower portion of said frame, opposite ground ribs extended above said seat adjacent to said flanges, a sliding gate mounted to travel in said flanges, locking-levers carried by said gate and provided with inclined ends disposed beneath the opposite flanges, and means for actuating said levers to clamp the gate upon either the seat or ribs.

6. In a water-gate, a frame provided with guide-flanges, a sliding gate mounted in said flanges, pivoting-lugs provided upon the outer face of said gate, locking-levers mounted in said lugs and adapted to engage beneath said flanges, and an actuating-nut provided with engaging devices at its opposite sides to receive the inner ends of said levers.

7. In a water-gate, a frame provided with guide-flanges, a sliding gate mounted in said flanges, pivoting-lugs provided upon the outer face of said gate, locking-levers mounted in said lugs and adapted to engage beneath said flanges, an operating-screw mounted in the lugs upon the face of said gate, a nut threaded upon said screw and provided upon its opposite sides with grooves or ways disposed diagonally to the axis of the screw, and an operating-handle for said screw.

8. A water-gate comprising a frame provided at opposite sides with undercut guide-flanges, an annular ground seat disposed between said flanges and surrounding an opening through said gate, a sliding gate mounted to travel in said flanges, and levers carried by the gate to engage said flanges for forcing it upon said seat.

9. A water-gate comprising a frame with guide-flanges at opposite sides, a gate mounted to slide beneath said flanges, locking-levers carried by the gate and disposed beneath said flanges, and lever, for operating the locking means to force said gate into contact with its frame.

10. A water-gate comprising a frame provided with undercut flanges at opposite sides, a gate mounted to slide beneath said flanges, locking means pivotally mounted upon said gate and adapted to wedge beneath said flanges, and means carried by the gate for operating said locking means.

In testimony whereof I affix my signature in presence of two witnesses.

TRUSTON CLARK.

Witnesses:
HENRY BURBANK,
CHARLES M. POTTER.